United States Patent
Hahn (10) Patent No.: US 7,274,402 B2
(45) Date of Patent: Sep. 25, 2007

(54) METHOD AND APPARATUS FOR MOTION-VECTOR-AIDED PIXEL INTERPOLATION

(75) Inventor: Marko Hahn, Munich (DE)

(73) Assignee: Micronas GmbH, Freiburg (DE)

( * ) Notice: Subject to any disclaimer, the term of this patent is extended or adjusted under 35 U.S.C. 154(b) by 409 days.

(21) Appl. No.: 10/871,881

(22) Filed: Jun. 18, 2004

(65) Prior Publication Data
US 2005/0024542 A1 Feb. 3, 2005

(30) Foreign Application Priority Data
Jun. 18, 2003 (DE) ............... 103 27 576

(51) Int. Cl.
*H04N 7/01* (2006.01)
*H04N 11/00* (2006.01)

(52) U.S. Cl. ............... 348/441; 348/701; 348/452; 348/459

(58) Field of Classification Search ............... 348/452, 348/459, 699–701, 716, 718; 382/293, 295, 382/298–300, 107, 167; 375/240.16
See application file for complete search history.

(56) References Cited

U.S. PATENT DOCUMENTS

| | | | |
|---|---|---|---|
| 5,214,751 A | | 5/1993 | Robert |
| 5,534,946 A | | 7/1996 | De Haan et al. ............ 348/619 |
| 5,646,691 A | * | 7/1997 | Yokoyama ............... 348/416.1 |
| 6,219,070 B1 | * | 4/2001 | Baker et al. ................ 345/475 |
| 6,385,245 B1 | | 5/2002 | De Haan et al. ............ 375/240 |
| 6,473,460 B1 | * | 10/2002 | Topper ................... 375/240.16 |
| 6,879,717 B2 | * | 4/2005 | Aggarwal et al. .......... 382/167 |
| 7,084,929 B2 | * | 8/2006 | Lange et al. ................ 348/716 |
| 2001/0012405 A1 | * | 8/2001 | Hagai et al. ................ 382/242 |
| 2003/0035482 A1 | * | 2/2003 | Klompenhouwer et al. ..................... 375/240.16 |
| 2004/0071313 A1 | | 4/2004 | Hahn et al. ................. 382/100 |
| 2004/0234143 A1 | * | 11/2004 | Hagai et al. ................ 382/238 |

OTHER PUBLICATIONS

EP search report.

* cited by examiner

*Primary Examiner*—Victor R. Kostak
(74) *Attorney, Agent, or Firm*—O'Shea, Getz & Kosakowski, P.C.

(57) ABSTRACT

In a method and apparatus for motion-vector-aided interpolation of a pixel in an intermediate image lying temporally or spatially between first and second images, motion vectors are assigned to the pixel to be interpolated, one pixel in each image being assigned to each vector. Video information values (e.g., luminance or chrominance values) are determined based on the video information values of pixels assigned to the motion vectors. A further video information value is generated by mixing certain of the video information values, and other video information values form a value interval, the mathematical position of the further video information value being determined relative to the interval boundaries. The video information value to be interpolated is determined depending on the position of the further video information value relative to the interval boundaries.

12 Claims, 6 Drawing Sheets

METHOD AND APPARATUS FOR MOTION-VECTOR-AIDED PIXEL INTERPOLATION

BACKGROUND OF THE INVENTION

The present invention relates to the field of video image processing, and in particular to motion-vector-aided pixel interpolation.

Motion or displacement vectors (hereinafter "motion vectors") in image processing define a position change of an object or of an image region from a first position in a first image to a second position in a second image. The two images can be acquired in temporal succession and thus visualize a motion of the object or image region over time. The motion vector in such cases is used, for example, in the interpolation of one or more intermediate images that reflect the position and/or other characteristics of the object/image region at one or more times between the acquisition of the first and second images, for example in 50 Hz/100 Hz image conversion or in the generation of "artificial slow motion." The two images can also be acquired simultaneously from first and second camera positions. In this case the motion vector is used to determine an intermediate image that shows the object/image region from a virtual third camera position lying between the first and second camera positions.

Techniques for estimating motion vectors for selected image regions, which in the extreme case comprise one pixel, on the basis of first and second images are well known. Typically, the image region at the initial point of the motion vector in the first image is determined along with the image region at the terminal point of the motion vector in the second image. An image region of the intermediate image can then be interpolated by using either the image region at the initial point of the motion vector in the first image or the image region at the terminal point of the motion vector in the second image. The position of the interpolated image region depends on the temporal position of the intermediate image between the two original images or the spatial position of the virtual camera position relative to the first and second camera positions.

Determination of the motion vector, however, usually involves errors, so that in known techniques the item of video information of a pixel of the intermediate image is determined by mixing together the item of video information of the pixel at the initial point of the motion vector in the first image and the item of video information of the pixel at the terminal point of the motion vector in the second image. For example, the items of video information of the two pixels can be weighted for mixing, depending on the application.

Techniques are also known in which a plurality of motion vectors are determined in each case for the individual image regions. Correspondingly, a plurality of motion vectors are likewise associated with a pixel in the intermediate image. In one known technique, the video information value of the pixel of the intermediate image is interpolated by applying median filtering to the video information values of the initial points of the motion vectors in the first image and the video information values of the terminal points of the motion vectors in the second image. Such a technique is described for example in U.S. Pat. No. 5,534,946.

What is needed is an easily implemented method and apparatus for motion-vector-aided pixel interpolation.

SUMMARY OF THE INVENTION

In a method and apparatus for motion-vector-aided interpolation of a pixel in an intermediate image lying temporally or spatially between first and second images, a first motion vector and a second motion vector are assigned to the pixel to be interpolated, one pixel in the first image and one pixel in the second image being assigned to each motion vector. A first video information value is determined on the basis of the video information value of a first pixel that is assigned to the first motion vector in the first image, and a second video information value is determined on the basis of the video information value of a second pixel that is assigned to the first motion vector in the second image. Furthermore, a first further video information value and a second further video information value are determined on the basis of the video information value of the pixel assigned to the second motion vector in the first image and of the pixel assigned to the second motion vector in the second image. Video information values refer for example to luminance values or chrominance values.

From the first and second further video information values, a third video information value is generated by mixing these video information values. The first and second video information values form a value interval, the mathematical position of the third video information value being determined relative to the interval boundaries. The video information value to be interpolated is determined depending on the position of the third video information value relative to the interval boundaries, a distinction being made as to whether the third video information value lies inside or outside the interval defined by the first and second video information values. If the third video information value lies inside this interval, then the third video information value is output as the video information value of the pixel to be interpolated. If the third video information value lies outside this interval, then the mathematical distance from the third video information value to the nearest interval boundary is determined, and a video information value is obtained that lies inside the interval and is spaced apart from the nearest interval boundary by the value of the distance between the third video information value and the nearest interval boundary or by a modified distance value. This video information value is selected as the video information value of the pixel to be interpolated.

A modified distance value resulting from the distance value determined, by which modified distance value the interpolated video information value is remote from the nearest interval boundary, is obtained for example with a gain or a damping. Gain is an increase in the value relative to the actual distance, while damping is a decrease in the value relative to the actual distance value.

If the third video information value lies outside the interval defined by the first and second video information values and if the distance from the third video information value to the nearest interval boundary is more than half the width of the interval, then the average of the first video information value and the second video information value is set as the interpolated video information value. This can be achieved for example if, in the determination of the distance between the third video information value and the nearest interval boundary, this distance value is limited to half the width of the interval. This technique ensures that the interpolated video information value lies between the first and second video information values or equals one of these video information values. The first and/or second video information values are preferably output as the interpolated video information value only if the two values are equal and the width of the interval is thus zero, or if the third video information value coincides with the first or second video information value.

To suppress noise, the distance between the third video information value and the nearest interval boundary, or a value resulting therefrom, is set at zero if this distance is smaller than a specified limit. The video information value representing the nearest interval boundary is output as the interpolated video information value. It is further possible to damp or diminish this value resulting from the distance.

The mixing technique for generating the third video information value from the first and second further video information values can be formulated in various ways. For example, the third video information value may equal the average of the first and second further video information values, which corresponds to a weighting of the first and second further video information values with a factor of 0.5 each. Such a uniform weighting of the video information values is used for example when the intermediate image lies spatially or temporally between the first and second images. In dependence on this position of the intermediate image, arbitrary further weight factors can be applied provided they have a unity sum in each case so that:

$$L3 = K4 \cdot L4 + K5 \cdot L5, \text{ with } K4+K5=1$$

where L3 is the third video information value, L4 is the first further video information value, L5 is the second further video information value, and K4 and K5 are the weighting factors.

Pixels may be assigned to motion vectors in the first image such that these pixels lie at the initial points of the motion vectors in the first image. Similarly, pixels may be assigned to motion vectors in the second image such that these pixels lie at the terminal points of the motion vectors in the second image. The first video information value may equal the video information value of the pixel at the initial point of the first motion vector in the first image, while the second video information value can equal the video information value of the pixel at the terminal point of the first motion vector in the second image.

The first and second video information values may also be determined in the following manner on the basis of more than two video information values. A plurality of first motion vectors are selected and video information values are determined for pixels assigned to these motion vectors in the first image and in the second image. Next, intervals are determined between each of the video information values of pixels assigned to the first motion vectors in the first image and each of the video information values of pixels assigned to the first motion vectors in the second image, and two of the video information values are selected as the first and second video information values. The two video information values selected may be those between which the largest interval is formed or between which the smallest interval is formed.

These and other objects, features and advantages of the present invention will become more apparent in light of the following detailed description of preferred embodiments thereof, as illustrated in the accompanying drawings.

DETAILED DESCRIPTION OF THE INVENTION

Except as otherwise stated, like reference characters in the drawings identify like parts with like meaning.

Figure 1:
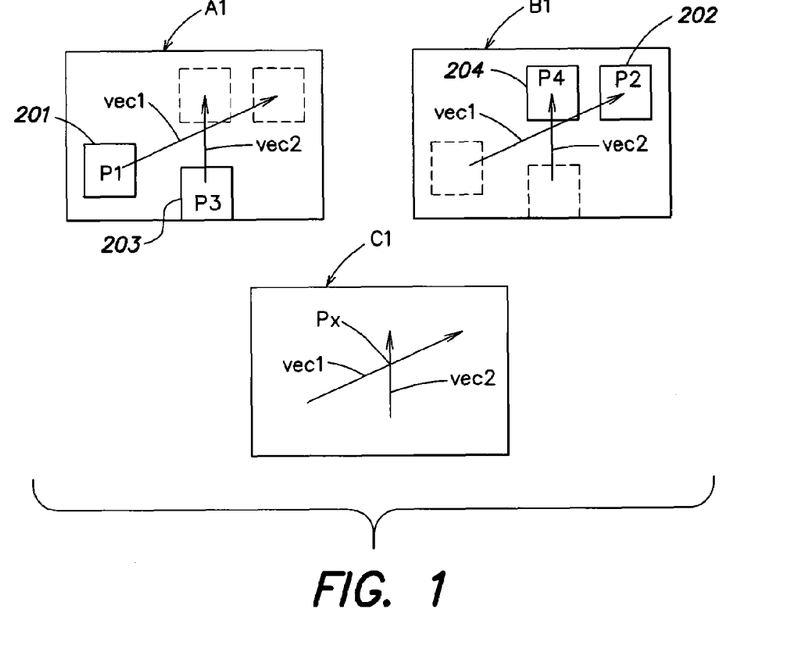
FIG. 1 illustrates two temporally or spatially successive images and an intermediate image generated by interpolation of the first and second images.

FIG. 1 illustrates two temporally or spatially successive images A1, B1 and an intermediate image C1 generated by interpolation of the first and second images A1 and B1. The images A1, B1 are each constructed from a plurality of pixels. The two images A1, B1 are acquired in temporal succession and thus visualize a motion of an object or image region over time. Alternatively, the two images A1, B1 may be acquired simultaneously from first and second camera positions and thus represent simultaneous depictions of an object from distinct viewing angles. The goal is to generate from images A1 and B1 an intermediate image C1 that represents a depiction of the object or image region at a time between the acquisition times of the first and second images A1, B1 in the case of temporally successive images A1, B1, and that represents a depiction of the object or image region from a further viewing angle in the case of images A1, B1 acquired simultaneously from distinct viewing angles.

A first motion vector VEC1 and a second motion vector VEC2 are assigned to a pixel Px to be interpolated, the pixel Px being a part of the object or image region of the intermediate image to be interpolated. The determination of motion vectors is generally well known.

In the intermediate image C1, it is assumed that the position of the pixel Px lies on a first motion vector that illustrates the displacement of a pixel P1 from the first image region 201 of the first image A1 to a pixel P2 in a second image region 202 of the second image B1. the motion vector VEC1 is thus for example assigned to all the pixels of the first image region 201 and states their displacement to the second image region 202.

The pixel Px to be interpolated further lies on a second motion vector, which represents the displacement of a third pixel P3 from a third image region 203 to a fourth pixel P4 in a fourth image region 204. Thus, two motion vectors VEC1, VEC2, which have been deemed equally good in, for example, an estimation method for motion vectors, are assigned to the pixel Px.

The method and apparatus offer an easily implemented way of interpolating the pixel Px of the intermediate image C1, to which at least two displacement vectors VEC1, VEC2 are assigned. Four pixels (P1-P4) are assigned via the motion vectors to the pixel to be interpolated, the four pixels representing the initial and terminal points of the motion vectors VEC1, VEC2 in the first and second images A1, B1.

The method and apparatus determine a value interval formed by the video information values assigned to the pixels that represent the initial point of one of the motion vectors VEC1 in the first image A1 and the terminal point of this vector in the second image B1. Also, a third video information value is generated from the video information values assigned to the initial and terminal points P3, P4 of the other motion vector VEC2. The video information values are for example luminance values or chrominance values.

The value interval between the video information values assigned to the first and second pixels P1, P2 is determined such that a first video information value L10 is assigned to the first pixel P1 and a second video information value L20 is assigned to the second pixel P2. Thus, the boundaries of the value interval are L10 and L20. The third video information value L3 is obtained by mixing a first further video information value L30 assigned to the pixel P3 and a second further video information value L40 assigned to the pixel P4. The mixing of the first and second further video information values L30, L40 to obtain the third video information value L3 may be performed according to the expression:

$$L3 = k3 \cdot L30 + k4 \cdot L40 \quad \text{EQ. 1}$$

where $k3 \geq 0$ and $k4 \geq 0$ and $k3 + k4 = 1$. The weight factors k3, k4 can be chosen arbitrarily in dependence on the application case within the bounds stated by EQ. 1. The weighting factors k3, k4 maybe set equal to 0.5, so that the third video information value L3 equals the average of the first and second further video information values L30, L40.

In one embodiment, the vector VEC2 is chosen as a zero vector, so that a pixel from the first image A1 and a pixel from the second image B1, each located at the position of the pixel Px to be interpolated, are mixed.

The position of the third video information value L3 is determined relative to the interval defined by the first and second video information values L10, L20. The video information value Lx of the pixel Px to be interpolated is selected depending on the position of the third video information value L3 relative to this interval, as is explained for three distinct examples with reference to FIGS. 2A-2C. The values for the first, second and third video information values L10, L20, L3 are plotted in FIGS. 2A-2C on an upwardly directed scale, these video information values L10, L20, L3 being for example luminance values that can take on values between 0 and 255.

Figure 2A:
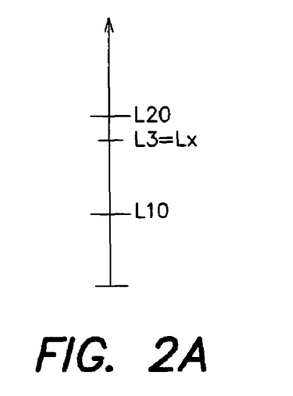
FIGS. 2A-2C each graphically illustrate an interval defined by first and second video information values and the position of a third video information value relative to the interval and the position of an interpolated video information value, in three different examples.

FIG. 2A illustrates a first scenario in which the first video information value L10 is smaller than the second video information value L20, and in which the third video information value L3 lies inside the interval given by the first video information value L10 and the second video information value L20. In this case, the third video information value L3 is selected as the video information value Lx of interpolated pixel Px. This does not depend on whether the first video information value L10 is larger or smaller than the second video information value L20. Instead, it only depends on the fact that the third video information value L3 lies inside the interval specified by these two video information values L10, L20.

Figure 2B:
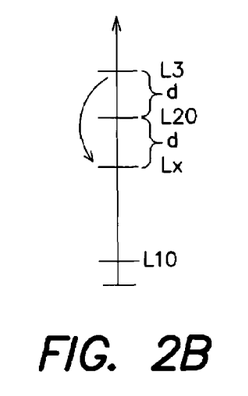

FIG. 2B illustrates a second scenario in which the first video information value L10 is again smaller than the second video information value L20, but the third video information value L3 is larger than the second video information value L20 and thus lies outside the interval formed by the first and second video information values L10, L20. In this case, the absolute value of the distance d between the third video information value L3 and the nearest interval boundary, which in FIG. 2B is defined by the second video information value L20, is determined. The interpolated video information value Lx in this case is determined by subtracting the distance d by which the third video information value L3 lies outside the interval from second video information value L20. Thus the video information value Lx is determined as lying inside the interval specified by L10 and L20 at a distance d from the interval boundary L20. In a geometric view, the interpolated video information value Lx arises by reflecting the third video information value L3 about the nearest interval boundary L20. The same situation occurs when the third video information value L3 is smaller than the first video information value L10, in which case a value representing the distance between the first video information value L10 and the third video information value L3 is then added to the first video information value L10 to obtain the interpolated video information value Lx.

Figure 2C:
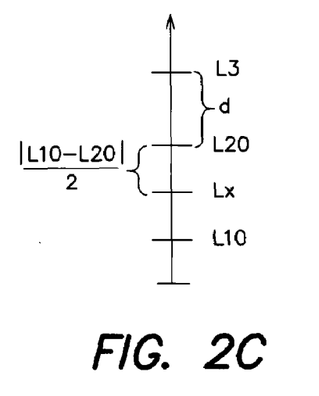

FIG. 2C illustrates a third scenario in which the third video information value L3 is again larger than the second video information value L20, but the absolute value of the distance d between the third video information value L3 and the second video information value L20 is larger than half the width of the interval specified by the first and second video information values L10, L20. In this case the average of the first video information value L10 and the second video information value L20 is output as the interpolated video information value Lx.

Figure 3:
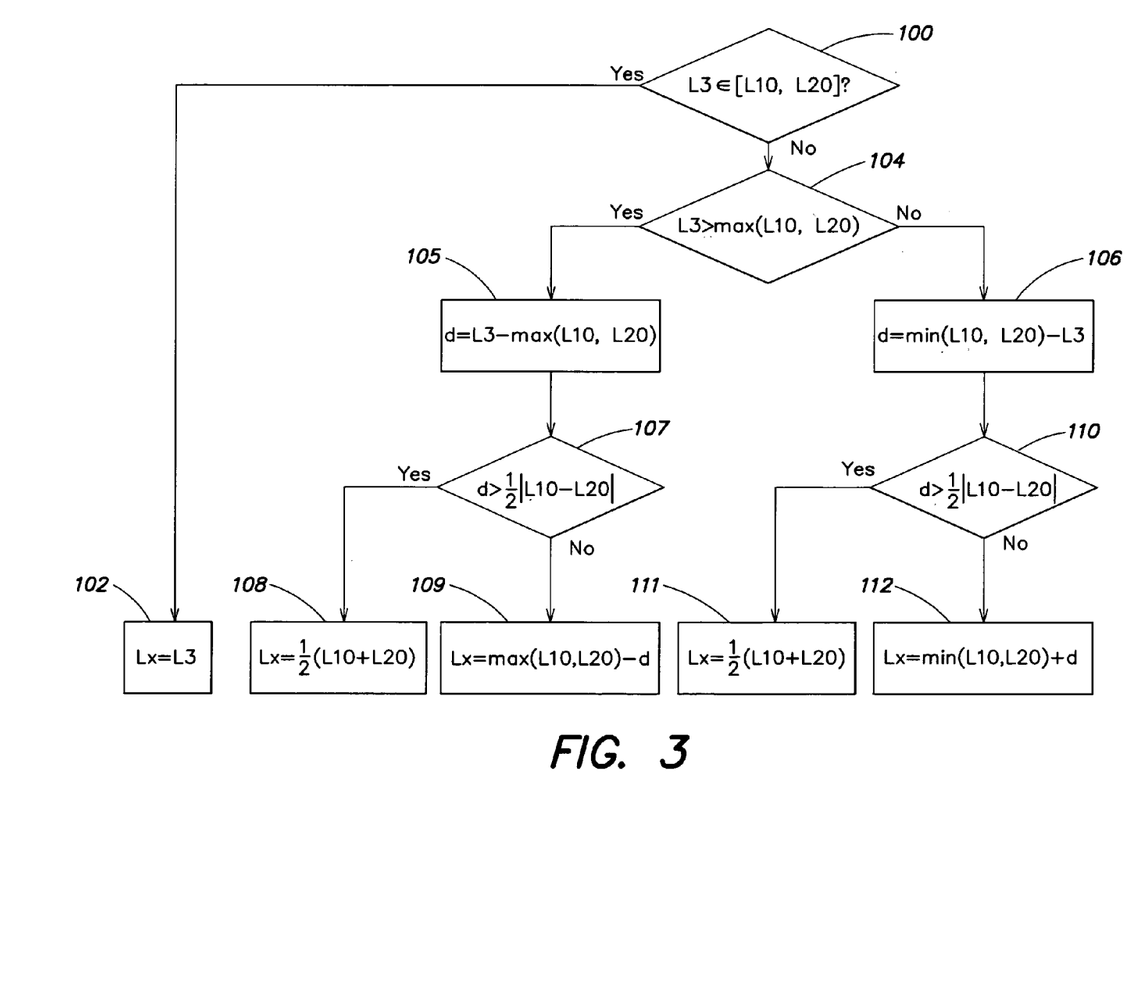
FIG. 3 is a flowchart of an image processing technique.

Referring to the flowchart of FIG. 3, in a first step 100 a test is performed to determine whether the third video information value L3 lies inside the interval given by the first video information value L10 and the second video information value L20. If yes, then in step 102 the video information value Lx to be interpolated is set equal to the third video information value L3. This is the situation illustrated in FIG. 2A.

If the third video information value L3 lies outside the interval given by the video information values L10, L20, then in step 104 a test is performed to determine whether the third video information value is larger than the larger of the two video information values L10, L20. In what follows, max(L10,L20) denotes the larger of these two video information values L10, L20, while min(L10,L20) denotes the smaller of these two video information values L10, L20.

If the third video information value L3 is larger than the larger of the two video information values L10, L20, which represents the upper bound of the interval, then in step 105 the distance d between the third video information value L3 and the upper interval boundary max(L10,L20) is determined by subtracting the value max(L10, L20) representing the upper bound of the interval from the third video information value L3. In step 107 a test is performed to determine whether this distance d is larger than half the absolute value of the difference between the first and second video information values L10, L20. If yes, then in step 108 the interpolated video information value Lx is set equal to the absolute value of the average of the first and second video information values L10, L20. This is the situation illustrated in FIG. 2C. If the distance d between the third video information value L3 and the upper bound max(L10,L20) of the interval is not larger than the absolute value of the average of the first and second video information values L10, L20, then in step 109 the interpolated video information value is determined by subtracting the distance value d from the upper interval boundary max(L10, L20). This is the situation illustrated in FIG. 2B.

If it is determined in step 104 that the third video information value L3 is not larger than the upper interval boundary max(L10,L20), then the third video information value L3 must be smaller than the lower interval boundary min(L10, L20), because it was already determined in step 100 that the third video information value L3 does not lie inside the interval given by the first and second video information values L10, L20. In step 106 the distance between the third video information value L3 and the lower interval boundary min(L10, L20) is then determined by subtracting the third video information value L3 from the lower interval boundary min(L10,L20). In subsequent step 110 a test is performed to determine whether the distance d is larger than half the absolute value of the difference between the first and second video information values L10, L20. If yes, the interpolated video information value Lx is set equal in a step 111 to the absolute value of the average of the first and second video information values L10, L20. If no, the interpolated video information value Lx is determined in a step 112 by adding the distance value d to the lower interval boundary min(L10,L20).

In the foregoing it was assumed that the first video information value L10 equals the video information value L1 of a first pixel P1, which represents the initial point of the first motion vector VEC1 in the first image A1, and that the second video information value L20 equals the video information value L2 of a second pixel P2, which represents the terminal point of the motion vector VEC1 in the second image B1.

In another embodiment, the first and second video information values L10, L20 defining the interval are determined on the basis of more than two motion vectors, the third video information value being determined as in the previous case by mixing the video information values at the initial and terminal points of a further motion vector.

To determine the first and second video information values L10, L20, a plurality of first motion vectors are selected and video information values are determined for pixels assigned to these motion vectors in the first image and in the second image. Next, one of the video information values, determined by the initial point of one of the motion vectors, is selected as the first video information value L10, and one of the video information values, determined by the terminal point of one of the motion vectors, is selected as the second video information value L20. To this end, intervals are preferably determined between each of the video information values of pixels assigned to the first motion vectors in the first image and each of the video information values of pixels assigned to the first motion vectors in the second image. The two video information values selected as the first and second video information values are preferably those between which the smallest interval is formed.

In a further embodiment, the first and second video information values L10, L20 are selected in the manner described above as video information values of the first and second pixels P1, P2 at the initial and terminal points of the first motion vector VEC1, and a plurality of second motion vectors are selected to determine the third video information value L3, the third video information value being determined with the following equation:

$$L3 = \Sigma kn \cdot Ln \quad \text{EQ. 2}$$

where $\Sigma kn = 1$, and with Ln being the video information values assigned to the individual further displacement vectors and kn being the associated weighting factors.

Figure 4:
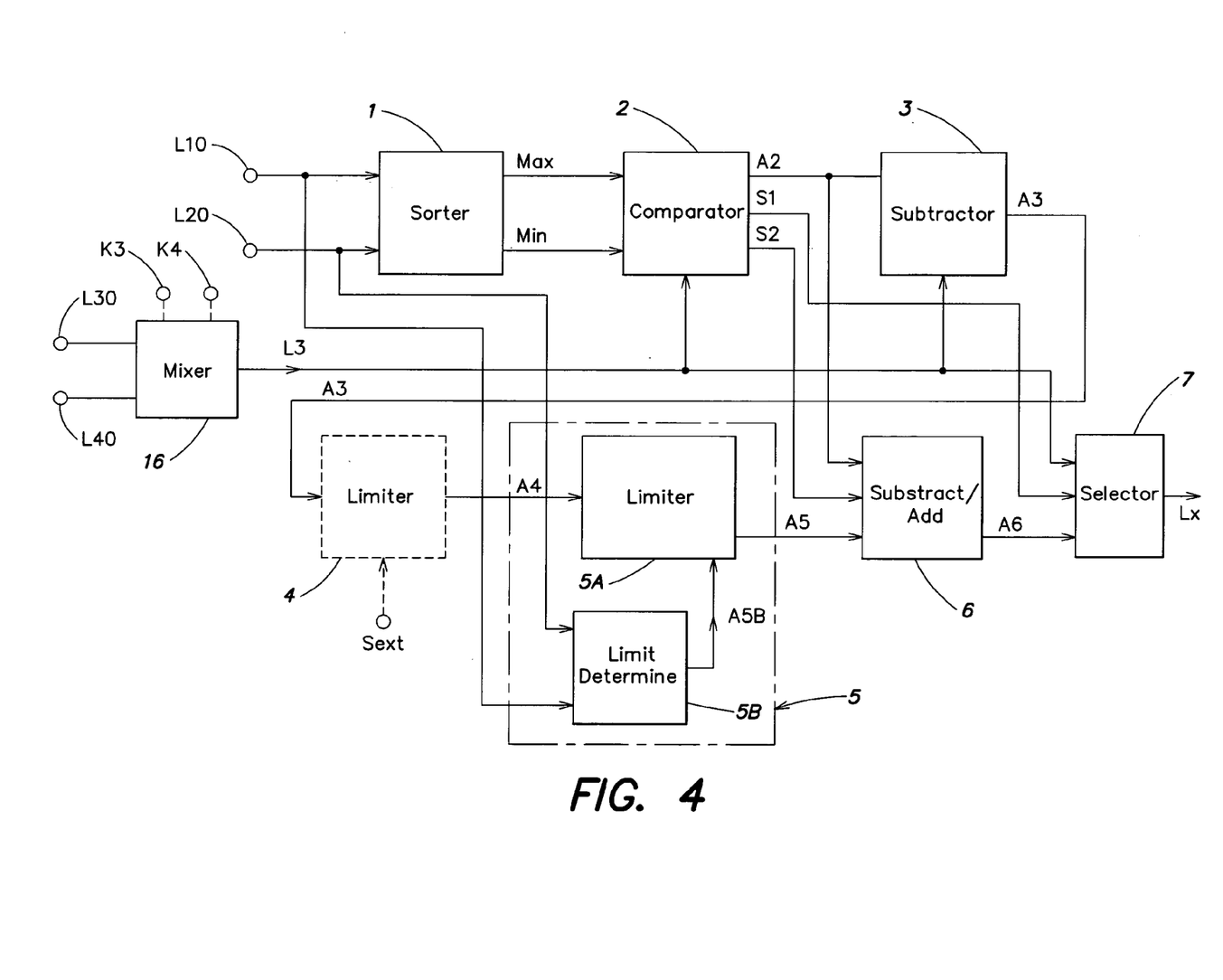
FIG. 4 is a block diagram of a first motion-vector-aided pixel interpolator.

Various motion-vector-aided interpolator apparatus are illustrated in FIGS. 4-7 for carrying out the steps in the flowchart of FIG. 3. FIG. 4 illustrates a first embodiment of an apparatus that receives the first video information value L10, the second video information value L20 and the third video information value L3, and provides the interpolated video information value Lx. This embodiment comprises a sorter 1, which is supplied with the first and second video information values L10, L20. The sorter 1 provides a first output signal Max=max(L10,L20) equaling the larger of the two video information values L10, L20, and a second output signal Min=min(L10,L20) equaling the smaller of the two video information values L10, L20. These output signals Max, Min are supplied to a comparator 2 together with the third video information value L3.

The third video information value L3 is provided by a mixer 16 from the first further video information value L30 and the second further video information value 40, and is determined by the mixer 16 according to EQ. 1. The weighting factors k3, k4 are specifiable as constants or, optionally, are capable of being set externally. It is also possible to supply the mixer with more than the two further video information values for the formation of the third video information value L3.

The comparator 2 provides a first control signal S1, which indicates whether the third video information value L3 lies inside an interval defined either by the first and second output signals Max, Min or by the first and second video information values L10,L20. The comparator 2 provides a second control signal S2, which indicates whether the third video information value L3 lies outside the defined interval and whether it is larger than the upper bound of the interval or smaller than the lower bound of the interval. If the third video information value L3 lies inside the interval boundaries, the second control signal S2 can be undefined. The comparator 2 also provides an output signal A2 that represents the interval boundary lying nearest the third video information value L3 when that value lies outside the interval boundaries. As such, the output signal A2 will equal either the first video information value L10 or the second video information value L20. If the third video information value L3 lies inside the interval defined by either the signals Max, Min, or the first and second video information values L1, L20, then the output signal A2 can be undefined as it is not needed for further processing.

Connected to the comparator 2 is a first subtractor 3, which provides an output signal A3 equaling the absolute value of a difference between the third video information value L3 and the output signal A2 of the comparator 2. The output signal A3 is supplied to a limiter 4 that limits the output signal A3 to a value that equals half the absolute value of the difference between the first and second video information values L10, L20. The limiter 5 comprises a limit determining circuit 5B, which is supplied with the first and second video information values L10, L20 and provides at its output a signal A5B that equals half the absolute value of the difference between the first and second video information values L10, L20 and is supplied to a limiter circuit 5A as a limit value.

The limiter 5 provides an output signal A5 from the limiter circuit 5A that equals either the output signal A3 of the subtractor 3 or the subtractor output signal A3 limited to the value of signal A5B. The limiter output signal A5, second control signal S2 and output signal A2 are supplied to a subtractor and adder arrangement 6, which, as directed by the second control signal S2, adds the output signals A5 and A2 or subtracts the output signal A5 from the output signal A2, and provides the result as the output signal A6.

Connected to the subtractor and adder arrangement 6 is a selector 7 to which the first control signal S1, the third video information value L3, and the output signal A6 are supplied.

As directed by the first control signal S1, the selector 7 outputs either the third video information value L3 or the output signal A6 as the interpolated video information value Lx.

A second limiter 4 is optionally connected between the first subtractor 3 and the first limiter 5. The second limiter 4, as directed for example by a control signal Sext supplied externally, sets the output signal A3 of the first subtractor 3 to zero if the value of the output signal A3 is smaller than a specified limit value, this limit value being selected for example such that it equals a usual noise signal amplitude. The limit value is chosen such that a zero results at the output of the second limiter 4 only for small differences, in particular for differences much smaller than the interval distance. The limit value may be selected depending on the interval distance.

Alternatively, an amplifier or a damper that amplifies or damps the difference signal is provided instead of the second limiter 4. The gain factor or the damping factor may be set externally. Further, it is possible to provide a limiter together with an amplifier or damper.

Figure 5:
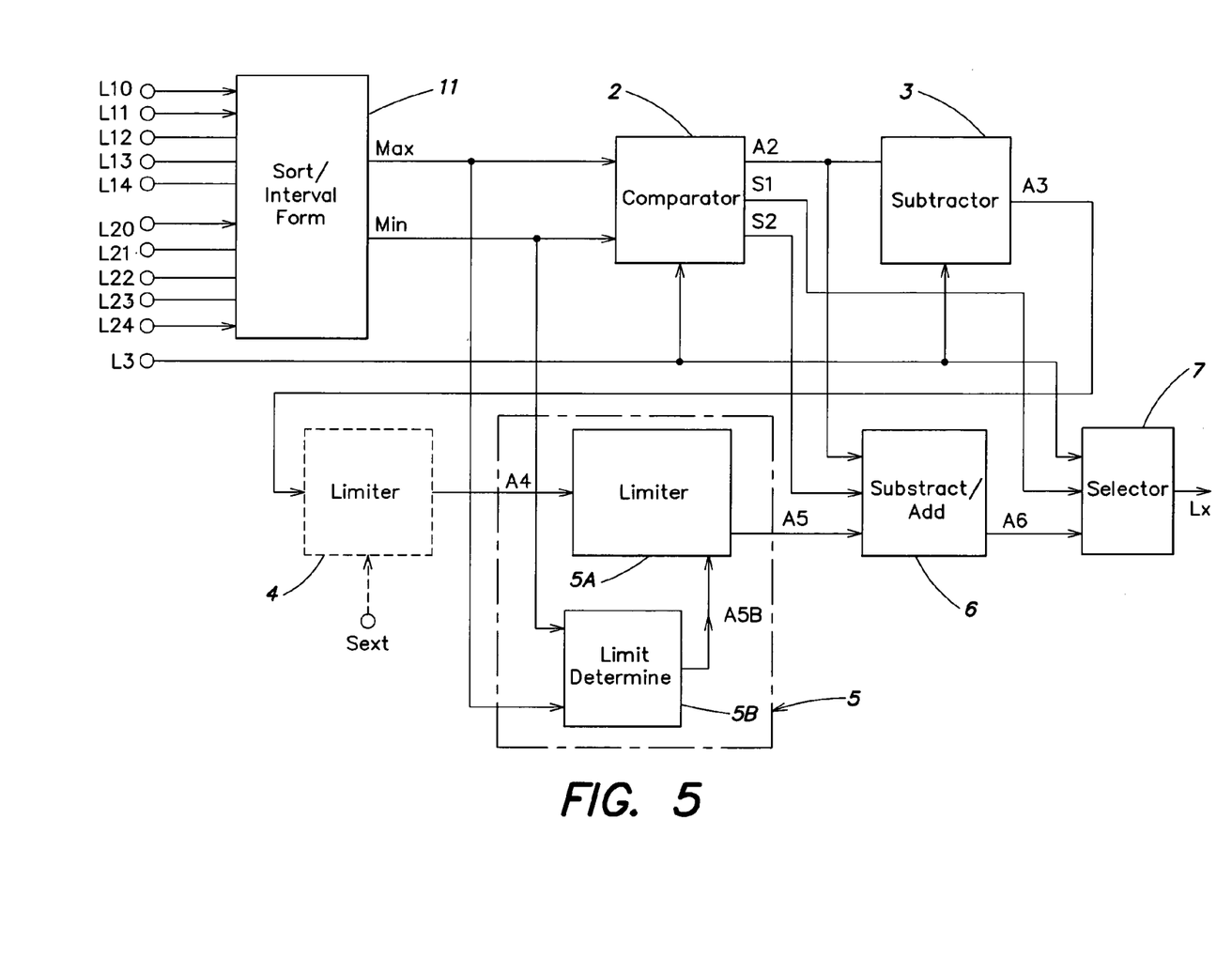
FIG. 5 is a block diagram of a second motion-vector-aided pixel interpolator.

FIG. 5 illustrates an alternative embodiment of the apparatus of FIG. 4. A sorting and interval forming unit 11 is connected to the comparator 2. The first and second video information values L10, L20, along with a plurality of additional first video information values L11, L12, L13, L14 and a plurality of additional second video information values L21, L22, L23, L24 are provided to the unit 11. Each of these represents video information values at the initial point of a motion vector in the first image and at the terminal point of a motion vector in the second image. The video information values are assigned to a motion vector thereby forming a video information value pair, such pairs in the example being are (L10, L20), (L11, L21), (L12, L22), (L13, L23) and (L14, L24). The sorting and interval forming unit 11 determines the video information value pair that spans the value interval smallest in absolute value, the larger value of this pair being output from the unit 11 as value Max and the smaller value of this pair being output as value Min. Thus, the unit 11 essentially replaces the mixer 16 of FIG. 4, everything else in FIG. 4 remaining the same in FIG. 5.

If the intervals of a plurality of video information value pairs are equal, one value pair is selected, for example, with the use of an ordering. This ordering takes account of the origin of the motion vector used in determining the video information values of a value pair. If two value pairs span the same interval width and if one value pair is based on a motion vector that was determined with reference to a temporally earlier image and if one value pair originates from a vector that was determined for example with reference to a spatially adjacent image region of the same image, then preference is given to the value pair of the spatially adjacent vector. This ordering thus takes account of the "temporal and spatial origin" of the vector underlying a value pair.

Figure 6:
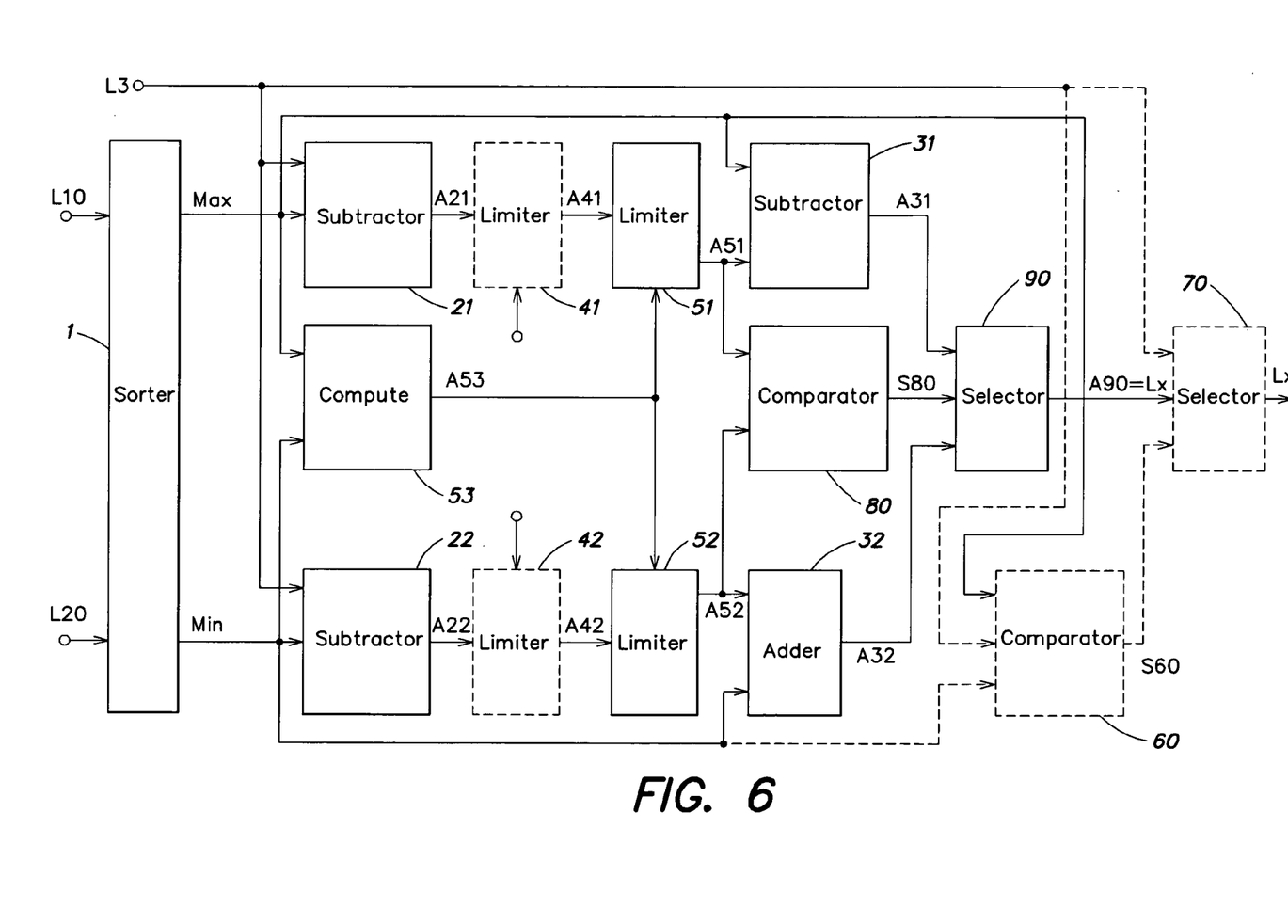
FIG. 6 is a block diagram of a third motion-vector-aided pixel interpolator.

FIG. 6 illustrates a further exemplary embodiment of an apparatus for generating an interpolated video information value Lx from at least a first video information value L10, a second video information value L20 and a third video information value L3. The apparatus includes a sorter 1, which provides the larger of the two values L10, L20 as value Max and the smaller of the two values L10, L20 as value Min. Also included is a first subtractor with absolute value formation 21, which is supplied with both Max=max(L10,L20) and third video information value L3, and provides an output signal A21 that equals the absolute value of the difference between Max and L3. A second subtractor with the absolute value formation 22 is supplied with both Min=min(L10,L20) and the third video information value L3, and provides an output signal A22 that equals the absolute value of the difference between Min and L3. If the first and second video information values L10, L20 are equally large, then Max and Min signals having equal amplitudes are provided at the inputs to the first and second subtractors 21, 22.

A first limiter 41 may optionally be connected to the first subtractor 21, and a second limiter 42 may optionally be connected to the second subtractor 22. Each limiter 41, 42 limits subtractor output signals A21, A22, for example to zero, if the amplitudes of these signals are below a specified limit that may be set for example by an external signal depending on a noise amplitude. The output signals A41, A42 from the first and second limiters 41, 42 are provided to third and fourth limiters 51, 52. If the first and second limiters 41, 42 are not present, then signal A41 equals signal A21 and signal A42 equals signal A22. An amplifier or a damper with gain/damping capable of being set externally may also be provided instead of the first and second limiters 41, 42. The third and fourth limiters 51, 52 limit the signal supplied to each to a value specified by a signal A53 provided by a computer 53 that determines half the absolute value of the difference between video information values Max and Min.

The output signal A51 of the third limiter 51 is supplied together with video information value Max to a third subtractor 31, which provides an output signal A31 that equals the difference between Max and A51. Output signal A52 of the fourth limiter 52 is supplied together with video information value Min to an adder 32, which provides an output signal A32 that equals the sum of Min and A52.

The output signal A51 of the third limiter 51 and output signal A52 of the fourth limiter 52 are supplied to a comparator 80, which provides a control signal S80 that indicates which of the two output signals A51, A52 is smaller. This control signal S80 is supplied together with output values A31, A32 of the third subtractor 31 or of the adder 32 to a first selector 90. The selector 90 provides one of output signals A31, A32 as output signal 90 as directed by the control signal S80. The selector 90 passes on output signal A31 of the third subtractor 31 as the output signal A90 if the control signal S80 indicates that the output signal A51 of the third limiter 51 is smaller than the output signal A52 of the fourth limiter 52. Correspondingly, the selector 90 passes on the output signal A32 of the adder 32 as the output signal A90 if the control signal S80 indicates that the output signal A52 from the fourth limiter 52 is smaller than the output signal A51 from the third limiter 51. If the signals A51 and A52 are equally large, an arbitrary one of the two values is selected by the selector circuit 90 as the output signal A90. The output signal A90 equals the interpolated video information value Lx if the first and second limiters 41, 42 are not present.

If the first and second limiters 41, 42 are present, then the apparatus further comprises a second comparator 60 and a second selector 70. The comparator 60 is supplied with video information values Max, Min and the third video information value L3, and provides a control signal S60 that indicates whether the third video information value L3 lies inside an interval defined by the first and second video information values L10, L20 or by values Max, Min.

The control signal S60, output signal A90, and the third video information value L3 are supplied to the second selector 70, which, as directed by the control signal S60, outputs either the third video information value L3 or the output signal of the first selector 90 as the interpolated video information value Lx.

Figure 7:
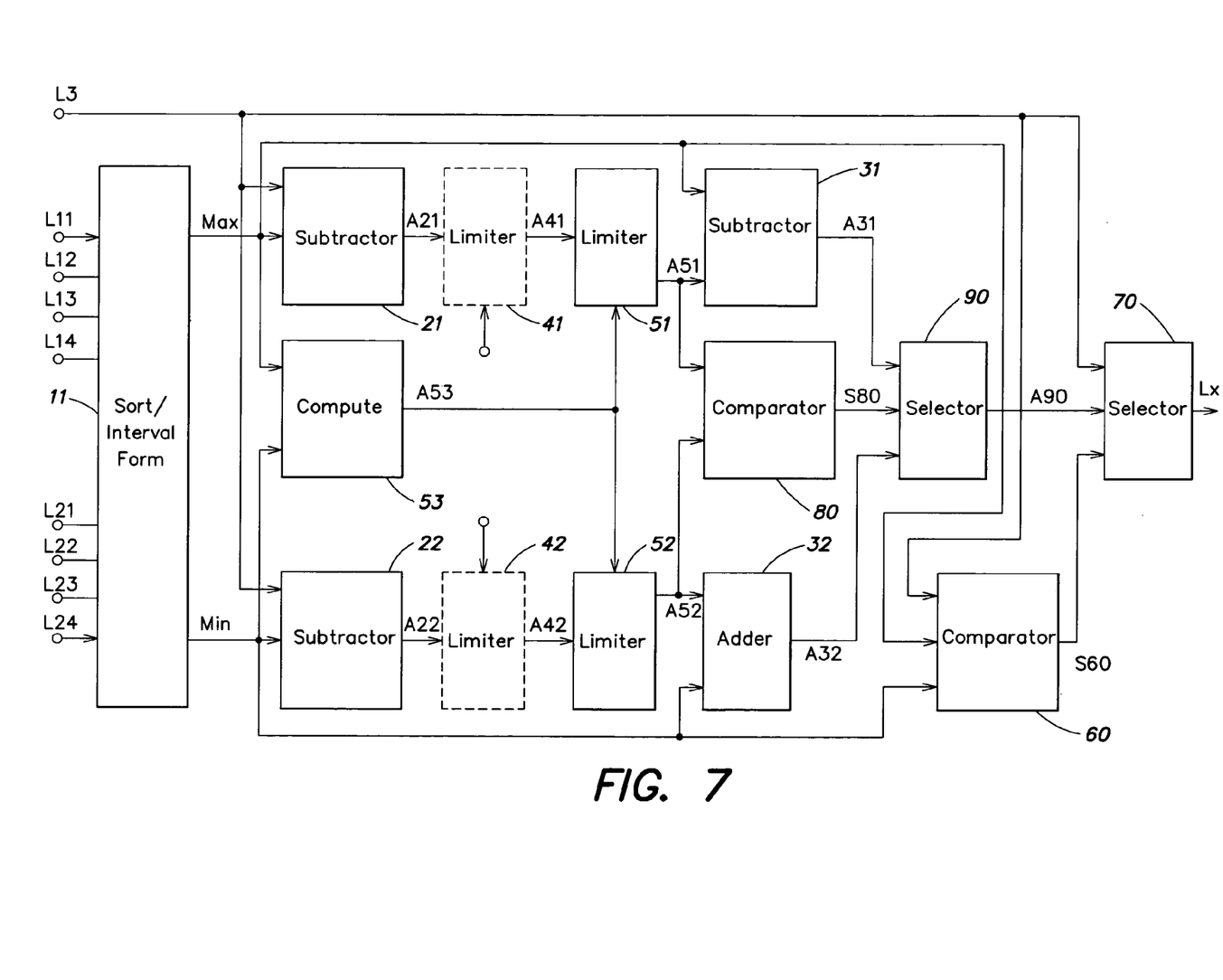
FIG. 7 is a block diagram of a fourth motion-vector-aided pixel interpolator.

FIG. 7 illustrates an alternative embodiment of the apparatus of FIG. 6 in which first and second video information values Max, Min are determined by a sorting and interval forming device 11 from the first and second video information values L10, L20 and from the additional first and second plurality of video information values L11-L14 and L21-L24, as described above with respect to FIG. 5.

Although the present invention has been shown and described with respect to several preferred embodiments thereof, various changes, omissions and additions to the form and detail thereof, may be made therein, without departing from the spirit and scope of the invention.

What is claimed is:

1. A method for motion-vector-aided interpolation of a pixel in an intermediate image lying between a first image and a second image, comprising the steps of:
   assigning a first motion vector and a second motion vector to the pixel to be interpolated;
   assigning a first pixel in the first image to the first motion vector and assigning a second pixel in the second image to the second motion vector;
   determining a first video information value based on a video information value of the first pixel and determining a second video information value based on a video information value of the second pixel;
   determining a first further video information value based on a video information value of a third pixel at an initial point of the second motion vector in the first image and determining a second further video information value based on a video information value of a fourth pixel at a terminal point of the second motion vector in the second image;
   generating a third video information value by mixing the first and second further video information values;
   determining an interval having boundaries defined by the first and second video information values;
   determining a position of the third video information value relative to the interval boundaries;
   selecting the third video information value as a video information value of the interpolated pixel if the third video information value lies inside the interval boundaries; and
   determining a video information value of the interpolated pixel if the third video information value lies outside the interval boundaries, by
   a) determining a mathematical distance from the third video information value to the nearest interval boundary;
   b) determining a video information value that is spaced apart from the nearest interval boundary by the value of the determined mathematical distance and lying inside the interval boundaries; and
   c) selecting the determined video information value from step b) as a video information value of the interpolated pixel.

2. The method of claim 1, where an average of the first and second video information values is selected as the video information value of the interpolated pixel if the third video information value lies outside the interval boundaries defined by the first and second video information values and the distance from the third video information value to the nearest interval boundary is larger than half the width of the interval.

3. The method of claim 1, where the determined mathematical distance is set equal to zero if the mathematical distance from the third video information value to the nearest interval boundary is smaller than a specified threshold value.

4. The method of claim 1, where the determined mathematical distance is increased.

5. The method of claim 1, where the determined mathematical distance is decreased.

6. The method of claim 1, where the second motion vector is a zero vector.

7. The method of claim 2, where the third video information value is generated from an average of the first and second further video information values.

8. The method of claim 1, further comprising the following steps determining the first and second video information values:
   d) selecting a plurality of the first motion vectors and determining the video information values of pixels assigned to the first motion vectors in the first image and determining the video information values of pixels assigned to the second motion vectors in the second image; and
   e) selecting one of the determined first video information values from step d) as the first video information value and selecting one of the determined second video information values from step e) as the second video information value.

9. The method of claim 8, further comprising the step of determining the intervals between each of the video information values of the pixels assigned to the first motion vectors in the first image and each of the video information values of the pixels assigned to the first motion vectors in the second image, and selecting as the first and second video information values the two video information values between which the smallest interval is formed.

10. The method of claim 1, further comprising the following steps for determining the first and second video information values:
    selecting a plurality of first motion vectors and determining, the video information values of pixels assigned to the first motion vectors in the first image and determining the video information values assigned to the first motion vectors in the second image;
    filtering the video information values determined on the basis of the first motion vectors to generate an intermediate value; and
    selecting the video information values assigned to one of the first motion vectors and selecting as the first and second video information values the two values, from a set including the first and second video information values and the intermediate value, that span the largest interval.

11. The method of claim 8, further comprising the step of determining intervals between each of the video information values of pixels assigned to the first motion vectors in the first image and each of the video information values of pixels assigned to the first motion vectors in the second image, and selecting as the first and second video information values the two video information values between which the largest interval is formed.

12. A method for determining a video information value of a pixel that is interpolated in an intermediate image lying between a first image and a second image, comprising the steps of:
    determining a position of an interpolated pixel video information value relative to an interval having boundaries defined by certain ones of a plurality of video information values associated with a plurality of pixels in each of the first and second images;

selecting the interpolated pixel video information value at the determined position as the determined video information value of the interpolated pixel if the determined position lies inside the interval boundaries;

determining the video information value of the interpolated pixel if the determined position lies outside the interval boundaries, by a) determining the distance from the determined position to the nearest interval boundary;

b) determining a video information value spaced from the nearest interval boundary by the value of the determined distance in step a) and lying inside the interval boundaries;

c) selecting the determined video information value from step b) as the determined video information value of the interpolated pixel, where the step of determining a position of an interpolated video information value relative to an interval further comprises the steps of:

assigning a first motion vector and a second motion vector to the pixel to be interpolated;

assigning a first pixel in the first image to the first motion vector and assigning a second pixel in the second image to the second motion vector;

determining a first video information value based on a video information value of the first pixel and determining a second video information value based on a video information value of the second pixel;

determining a first further video information value based on a video information value of a third pixel at an initial point of the second motion vector in the first image and determining a second further video information value based on a video information value of a fourth pixel at a terminal point of the second motion vector in the second image;

generating a third video information value from the first and second further video information values;

determining the interval having boundaries defined by the first and second video information values; and determining a position of the third video information value relative to the interval boundaries, the position of the third video information value being the determined video information value of the interpolated pixel.

* * * * *

UNITED STATES PATENT AND TRADEMARK OFFICE
CERTIFICATE OF CORRECTION

PATENT NO. : 7,274,402 B2 Page 1 of 1
APPLICATION NO. : 10/871881
DATED : September 25, 2007
INVENTOR(S) : Marko Hahn It is certified that error appears in the above-identified patent and that said Letters Patent is hereby corrected as shown below:

On the Title page & Col. 1 line 1
In the title, delete "AND APPARATUS"

Column 4
line 47, before "motion" delete " the" and insert --The--

Column 6
line 2, before "second" insert --the--

Signed and Sealed this

Fourth Day of December, 2007

JON W. DUDAS
*Director of the United States Patent and Trademark Office*